US008711965B2

(12) United States Patent
Sari

(10) Patent No.: US 8,711,965 B2
(45) Date of Patent: Apr. 29, 2014

(54) METHOD AND APPARATUS FOR OPTIMIZING TRANSMISSION DIVERSITY

(75) Inventor: Hikmet Sari, Charenton (FR)

(73) Assignee: Sequans Communications, Paris le Defense Cedex (FR)

( * ) Notice: Subject to any disclaimer, the term of this patent is extended or adjusted under 35 U.S.C. 154(b) by 318 days.

(21) Appl. No.: 13/074,637

(22) Filed: Mar. 29, 2011

(65) Prior Publication Data

US 2011/0235735 A1     Sep. 29, 2011

(30) Foreign Application Priority Data

Mar. 29, 2010  (EP) ..................................... 10158232

(51) Int. Cl.
*H04B 7/02*     (2006.01)
(52) U.S. Cl.
USPC ........... 375/267; 375/260; 375/299; 375/347; 375/349
(58) Field of Classification Search
USPC ............................ 375/267, 260, 299, 347, 349
See application file for complete search history.

(56) References Cited

U.S. PATENT DOCUMENTS

| 2005/0113041 | A1 | 5/2005 | Polley et al. |
| 2005/0254592 | A1* | 11/2005 | Naguib et al. ................. 375/267 |
| 2008/0089442 | A1 | 4/2008 | Lee et al. |
| 2008/0267273 | A1* | 10/2008 | Aue ............................... 375/224 |
| 2008/0311858 | A1 | 12/2008 | Cheng et al. |
| 2009/0279624 | A1 | 11/2009 | Chen et al. |

OTHER PUBLICATIONS

European Search Report and Written Opinion dated Sep. 1, 2010 for corresponding European Application No. 10 158 232.8, filed Mar. 29, 2010.

* cited by examiner

*Primary Examiner* — Kabir A Timory
(74) *Attorney, Agent, or Firm* — David D. Brush; Westman, Champlin & Koehler, P.A.

(57) ABSTRACT

A method and apparatus are provided for transmission in a communication system. The system includes a transmitter having at least one first and second antenna and a receiver, which includes at least one receiving antenna. The method includes determining a transmit diversity scheme for at least one group of symbols from among a plurality of modulated symbols. This step includes at least one step of obtaining a phase shift of at least one symbol of the at least one group of symbols. The phase shift is based on: at least one phase shift parameter N; and responses ($h_{k1}$, $h_{k2}$), respectively, between the at least one first antenna and the at least one receiving antenna and between the at least one second antenna and the at least one receiving antenna. The method further includes a step of phase shifting, allowing rotation of said symbol at a multiple of a $\pi/N$ value.

9 Claims, 2 Drawing Sheets

METHOD AND APPARATUS FOR OPTIMIZING TRANSMISSION DIVERSITY

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to wireless digital transmission systems. More particularly, the disclosure relates to a method and to a device for optimizing transmission diversity scheme in wireless communication systems.

Performance of wireless communications systems is strongly affected by signal fading due to multipath propagation. In wireless telecommunications, multipath is a propagation phenomenon that results in radio signals reaching the receiving antenna by two or more paths. There are many causes of multipath propagation.

To increase robustness against this phenomenon, space (or spatial) diversity techniques are often used. Spatial diversity consists of using multiple antennas at transmitter side or at the receiver side. In the first case, when used at the transmitter side, it is called transmit diversity (or transmission diversity), and in the second case, when used at the receiving side, it is called receive diversity (or reception diversity).

In point-to-point wireless communication systems, the conventional approach is to use receive diversity. This technique is also suitable on the uplink of cellular systems, whereas transmit diversity is a more desirable approach for the downlink, because it does not require multiple antennas at the user terminal (which is often the case in practice).

BACKGROUND

For several decades, point-to-point wireless communications systems employed receive diversity based on antenna switching, equal-gain combining (EGC), or maximum-ratio combining (MRC). But with the development of cellular systems in the nineties, attention was turned to transmit diversity, which is more appropriate for the downlink.

The user terminal cost and power consumption considerations indeed favour transmit diversity with respect to receive diversity on the downlink, because this technique does not require the use of multiple antennas at user terminals.

The most well-known transmit diversity technique is the one introduced by Alamouti. This technique, which does not require any channel state information (CSI) at the transmitter side, has been included in most of the recently developed wireless communications systems standards including the IEEE 802.11n-2009 standard for Local Area Networks and the IEEE 802.16e-2005 standard, on which mobile WiMAX systems are based. Alamouti's transmit diversity leads to the same diversity order as the optimum receive diversity (MRC), but it loses 3 dB in terms of received signal-to-noise ratio (SNR) for the same total transmit power.

There are other transmit diversity options when the channel state information (CSI) is known either partially or fully at the transmitter side. One of these is the switching transmit diversity (STD).

In such a scheme, the channel is monitored through power measurements for the two transmit antennas and the best antenna is selected for transmission. STD loses some diversity gain with respect to MRC and Alamouti's transmit diversity, but it avoids the 3 dB loss of the Alamouti's technique in terms of SNR at the receiver. On the other hand, optimum transmit diversity (OTD) achieves the performance of MRC, but it requires the use of two transmit amplifiers each of which must be capable of transmitting the total transmit power. This leads to more costly transmitters.

For clarity, we now briefly describe the conventional spatial diversity techniques mentioned above.

The optimum spatial diversity technique at the receiver side is MRC, which can be described as follows for 2 receive antennas: Let $h_{k1}$ and $h_{k2}$ be the channel responses between the transmit antenna and the first and the second receive antenna, respectively. The signals received by the two receive antennas can be written as:

$$r_{k1} = h_{k1}s_k + n_{k1} \quad (1.a)$$

$$r_{k2} = h_{k2}s_k + n_{k2} \quad (1.b)$$

where $n_{k1}$ and $n_{k2}$ are the additive noise terms. In MRC, the receiver computes:

$$x_k = h^*_{k1} r_{k1} + h^*_{k2} r_{k2}$$

$$= (|h_{k1}|^2 + |h_{k2}|^2) s_k + h^*_{k1} n_{k1} + h^*_{k2} n_{k2} \quad (2)$$

Symbol $s_k$ is detected by sending $x_k$ to a threshold detector. The signal-to-noise ratio (SNR) at the threshold detector input can be expressed as $$SNR_k = (|h_{k1}|^2 + |h_{k2}|^2) \cdot SNR_0 \quad (3)$$

where $SNR_0$ is the power ratio of the transmitted symbols and the channel noise.

Next, optimum transmit diversity (OTD) consists of transmitting the data symbols such that the signals from the two transmit antennas arrive at the receiver in strictly identical phase and using optimum power loading.

More specifically, with $h_{k1} = |h_{k1}|\exp(j\theta_1)$ denoting the channel response between the first transmit antenna and the receive antenna, and $h_{k2} = |h_{k2}|\exp(j\theta_2)$ denoting the response between the second transmit antenna and the receive antenna, the signals transmitted by the two antennas are of the form:

$$x_{k1} = \frac{|h_{k1}|}{\sqrt{|h_{k1}|^2 + |h_{k2}|^2}} s_k \quad (4.a)$$

and $$x_{k2} = \frac{|h_{k2}|\exp j(\theta_1 - \theta_2)}{\sqrt{|h_{k1}|^2 + |h_{k2}|^2}} s_k, \quad (4.b)$$

respectively. It can be easily verified that the SNR at the receiver is identical to that of MRC given by (3).

A diversity technique which comes close to OTD in terms of performance while avoiding the simultaneous use of multiple transmitters (which is cheaper) is known as switching transmit diversity (STD). Note that performance of switching diversity is the same whether switching is used at the transmitter or at the receiver. Focusing on STD at the transmit side, in the two transmit antenna case, the signal is transmitted from the first antenna if $|h_{k1}| \geq |h_{k2}|$ and it is transmitted from the second antenna otherwise. Then, the received signal can be written in the form:

$$r_k = \begin{cases} h_{k1}s_k + n_{k1}, & \text{if } |h_{k1}| \geq |h_{k2}| \\ h_{k2}s_k + n_{k2}, & \text{if } |h_{k1}| < |h_{k2}| \end{cases} \quad (5)$$

and the SNR at the threshold detector input becomes:

$$SNR_k = \begin{cases} |h_{k1}|^2 SNR_0 & \text{if } |h_{k1}| \geq |h_{k2}| \\ |h_{k2}|^2 SNR_0 & \text{if } |h_{k1}| < |h_{k2}| \end{cases} \quad (6)$$

It can be easily shown that, in terms of SNR, STD loses some 1.0-1.5 dB with respect to OTD.

A problem is that when no channel state information (CSI) is available at the transmitter side, OTD and STD cannot be implemented.

In that case, one may resort to Alamouti's transmit diversity. This technique leads to the same diversity performance as MRC and OTD, but it loses 3 dB in terms of SNR at the receiver, which is not desirable. This can be deduced by comparing (3) to the receiver SNR in Alamouti's transmit diversity which is given by:

$$SNR_k = (|h_{k1}|^2 + |h_{k2}|^2) \cdot SNR_0/2 \quad (7)$$

SUMMARY

An illustrative aspect of the present disclosure concerns a method for transmission in a transmitter of a communication system, said system comprising said transmitter which comprises at least one first (TA1) and one second (TA2) transmitting antenna and a receiver which comprises at least one receiving antenna (RA1), said method comprising a step of determining a transmit diversity scheme for at least one group of symbols from among a plurality of modulated symbols.

According to an illustrative embodiment, said step of determining said transmit diversity scheme comprises at least one step for obtaining a phase shift of at least one symbol of said at least one group of symbols, said phase shift being based on:
at least one phase shift parameter N and
responses ($h_{k1}$, $h_{k2}$) respectively between said at least one first (TA1) transmitting antenna and said at least one receiving antenna (RA1) and between said at least one second (TA2) transmitting antenna and said at least one receiving antenna (RA1),
and said method comprises a step of phase shift allowing rotating said symbol at a multiple of $\pi/N$ value.

Thus, the method does not require the use of numerous processing means for calculating a precise rotating value. Indeed, according to the invention, the rotation of the symbol is done at a $\pi/N$ value, which limits to N the number of calculations to realize for determining the more appropriate rotating value.

In a specific embodiment, said step for obtaining said phase shift comprises:
a step of processing a plurality of quantities $H_k(n)$, where $0 \leq n \leq N-1$, which are function of said responses of each antenna ($h_{k1}$, $h_{k2}$) at a given time k.
a step of selecting a phase shift based on said plurality of quantities $H_k(n)$ previously processed.

Thus, a quantity calculation parameter is simply used for determining some quantities which are used for selecting a phase shift. The method does not require a high processing power, because the quantity calculation parameter is used to limit the number of calculations to realize.

In a specific embodiment, said step of selecting a phase shift comprises a step for choosing the highest quantity $H_k(n)$, among said plurality of quantities $H_k(n)$, where $0 \leq n \leq N-1$.

Thus, the number of calculations to carry out is limited to N. In a particular embodiment, N is equal to 4. Thus, there are only four calculations to carry out for finding the phase shift.

In a specific embodiment, when said transmitter comprises one first (TA1) and one second (TA2) antenna and said receiver comprises one receiving antenna (RA1), said quantity $H_k(n)$ is calculated with the following formula:

$$H_k(n) = |h_{k1} + e^{jn\pi/2} h_{k2}|$$

In a specific embodiment, said value of said phase shift is $e^{jn\pi/2}$, where $0 \leq n \leq N-1$.

In a specific embodiment, when said transmitter comprises one first (TA1) and one second (TA2) antenna and said receiver comprises one first (RA1) and one second (RA2) antenna, said quantity H(n) is calculated with the following formula:

$$H_k(n) = |h_{k1} + e^{jn\pi/2} h_{k2}|^2 + |h_{k3} + e^{jn\pi/2} h_{k4}|^2$$

Where:
$h_{k1}$ is the response of the channel between first transmitting antenna (TA1) and first receiving antenna (RA1) at time k;
$h_{k2}$ is the response of the channel between second transmitting antenna (TA2) and first receiving antenna (RA1) at time k;
$h_{k3}$ is the response of the channel between first receiving antenna (TA1) at and second receiving antenna (RA2) time k;
$h_{k4}$ is the response of the channel between second transmitting antenna (TA2) and second receiving antenna (RA2) at time k;

In a specific embodiment, at time k, a first signal $x_{k1}$ is transmitted from the first transmitting antenna (TA1) with the value $$x_{k1} = \frac{s_k}{\sqrt{2}}$$

and in that a second signal $x_{k2}$ is transmitted from the second transmitting antenna (TA2) with the value $$x_{k2} = \frac{e^{jn\pi/2} s_k}{\sqrt{2}}.$$

In a specific embodiment, in an OFDM based system, said method is used on a carrier-by-carrier basis, allowing calculating a phase shift for at least some of a plurality of carriers.

An illustrative embodiment of the disclosure also relates to an apparatus for transmission in a transmitter of a communication system, said system comprising said transmitter which comprises at least one first (TA1) and one second (TA2) antenna and a receiver which comprises at least one receiving antenna (RA1), said apparatus comprising means for determining a transmit diversity scheme for at least one group of symbols from among a plurality of modulated symbols.

According to an illustrative embodiment, said means for determining said transmit diversity scheme comprises means for obtaining a phase shift of at least one symbol of said at least one group of symbols, said phase shift being based on:
at least one phase shift parameter N and
responses ($h_{k1}$, $h_{k2}$) respectively between said at least one first (TA1) antenna and said at least one receiving antenna (RA1) and between said at least one second (TA2) antenna and said at least one receiving antenna (RA1),
and the apparatus comprises means for phase shift, allowing rotating said symbol at a multiple of $\pi/N$ value.

An illustrative embodiment of the disclosure also relates to a computer program product downloadable from a communications network and/or stored on a computer readable medium and/or executed by a microprocessor. The computer program product includes instructions of program code for implementing the transmit diversity optimizing method when run on a computer.

BRIEF DESCRIPTION OF THE DRAWINGS

The proposed method is described in the following by way of examples in connection with the accompanying figures without limiting the scope of the protection as defined by the claims. The figures show:

DETAILED DESCRIPTION OF ILLUSTRATIVE EMBODIMENTS

1. Main Features

An example of the subject matter disclosed below provides a technique for enabling a multiple-antenna device to achieve performance improvements when communicating with a single-antenna device or when communicating with a multiple-antenna device operating in a single-antenna mode. One or more embodiments described herein may be provided in the context of an IEEE 802.11 compliant device, but other wireless protocols, for example, now known or later developed, may be used as well.

These effects are simply achieved by the present disclosure by rotating the signal. In other words, the phase of the signal transmitted from the second antenna is shifted, before transmission, compared to the signal transmitted by the first antenna. Of course, the phase shift which is applied on the signal is obtained with an application of a specific function which takes advantage of the following parameters:

the responses of the transmission channel between these transmit antennas and the antenna of the receiver ($h_{k1}$, $h_{k2}$);

a specific rotating calculation parameter, denoted N; this specific rotating calculation parameter N is also called the phase shift parameter N.

These parameters allow processing quantities $H_k(n)$ where $0 \le n \le N-1$ and k is a given time, defined by the following formula for two transmission antennas TA1 and TA2:

$$H_k(n) = |h_{k1} + e^{jn\pi/2} h_{k2}|$$

If the transmitter has three antennas, another function is used to process quantities using the response of the transmission channel between the first transmission antenna and the reception antenna ($h_{k1}$) and the transmission channel between the third transmission antenna and the reception antenna ($h_{k3}$). Thus, in this case, the formula will be:

$$H_k(m) = |h_{k1} + e^{jm\pi/2} h_{k3}| \text{ where } 0 \le m \le N-1.$$

Figure 1:
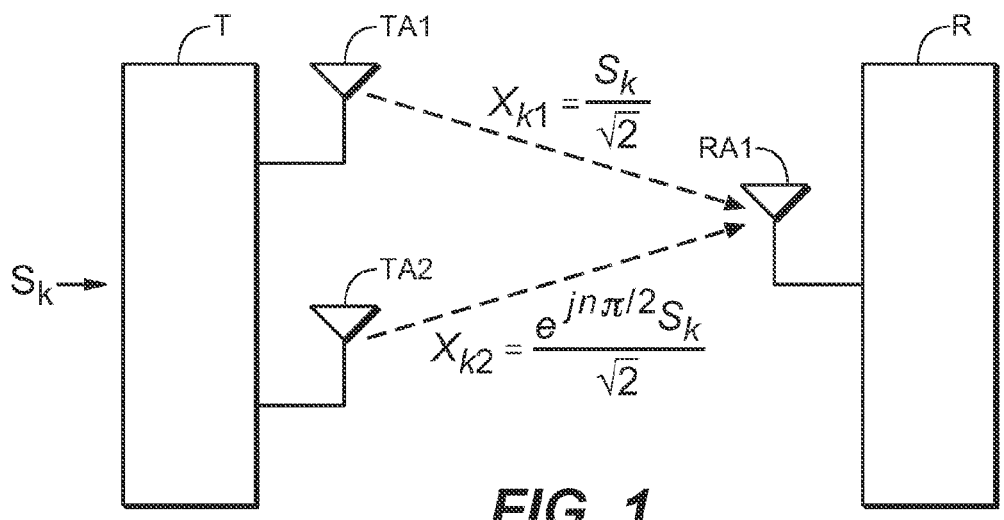
FIG. 1 represents a flowchart of the method of an illustrative embodiment.
Figure 2:
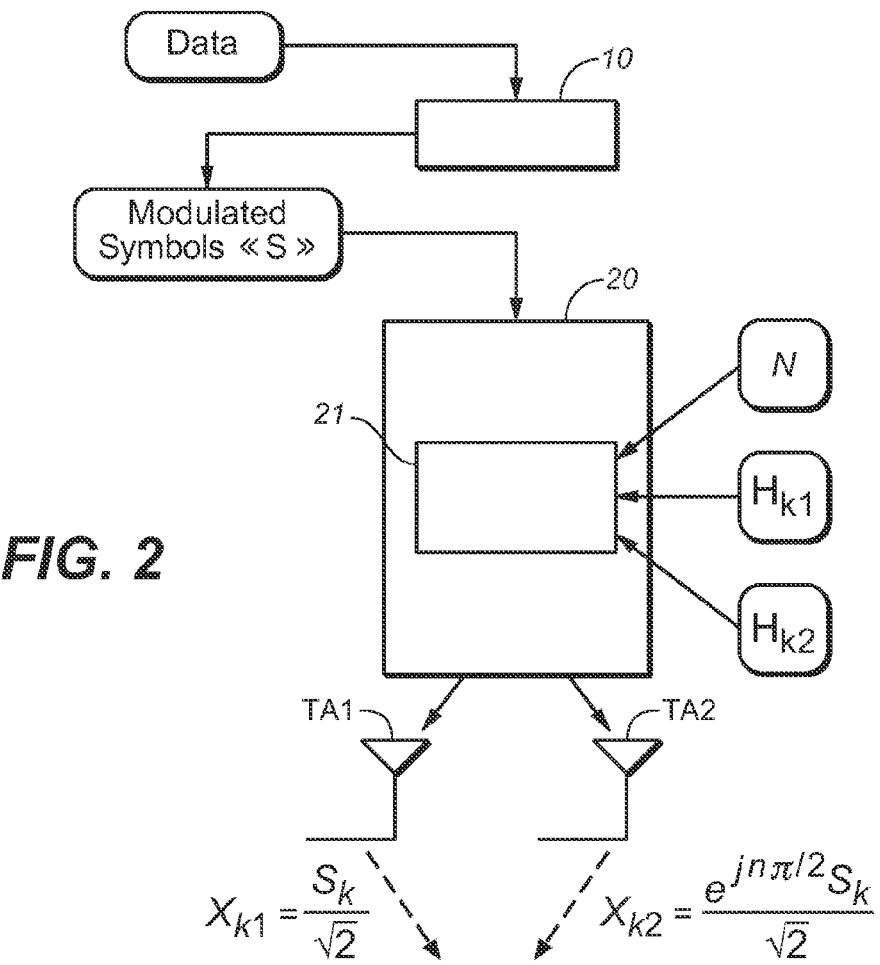
FIG. 2 illustrates phase shift in the case of a two antennas transmitter and a single antenna receiver.

We present, in relation with FIG. 1 and FIG. 2, a short description of the method of an illustrative embodiment. The embodiment relates to a method for transmission in a communication system comprising a transmitter (TR) comprising at least one first (TA1) and one second (TA2) antenna and a receiver (RC) comprising at least one receiving antenna (RA1). The method comprises:

a step of modulating data (10) to be transmitted by using a certain modulation scheme to generate a plurality of modulated symbols, a step of determining a transmit diversity scheme (20) for at least one group of symbols from among the plurality of modulated symbols, According to an illustrative embodiment, said step of determining said transmit diversity scheme (20) comprise at least one step for determining a phase shift ($e^{jn\pi/2}$) of at least one symbol of said at least one group of symbols based on at least one phase shift parameter N and some responses ($h_{k1}$, $h_{k2}$) of the transmission channel of said at least one first (TA1) and one second (TA2) antenna with the receiving antenna (RA1).

The value of the rotation, applied on the signal transmitted from the antennas is calculated by using a simple function which does not consume many resources in the transmitter and gives results that are close from the optimal OTD.

The proposed technique has the following advantages:

the transmit diversity system that we have described gives essentially the same performance as ideal Equal Gain Transmit diversity while it substantially decreases complexity.

compared to Optimum Transmit Diversity, it only loses 0.5-0.7 dB in terms of Bit Error Rate vs. SNR, while it relaxes the power amplifier requirements by 3 dB for a given transmit power.

compared to Switching Transmit Diversity, it gains 0.7 dB.

compared to Alamouti Space-Time Coding, it gains 2.2 dB.

Below, a specific embodiment is described, where only two transmission antennas are used for the transmission to a terminal comprising only one reception antenna.

The following discussion is directed to various embodiments of the present disclosure. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

2. Specific Embodiment

In this a specific embodiment, two transmission antennas are used by the transmitter.

As given by equations (4.a) and (4.b), the instantaneous power transmitted from each antenna in OTD is a function of the two channel responses.

If the magnitude of $h_{k1}$ is close to 0, virtually all of the power is transmitted from the second antenna, and, conversely, if the magnitude of $h_{k2}$ is close to 0, virtually all of the power is transmitted from the first antenna. Therefore, an OTD system must use two transmitters each having a high-power amplifier with the same characteristics as that of a transmitter used in an MRC-based system to achieve the same performance.

On the other hand, the transmit power in Alamouti's transmit diversity is equally divided between the two transmitters, but as indicated earlier this technique loses 3 dB in receiver SNR with respect to OTD.

In this specific embodiment, an equal-power transmit diversity (EPTD) is used, which transmits from each antenna the same power as Alamouti's transmit diversity, while avoiding most of the 3 dB loss of the latter technique in terms of SNR at the receiver.

The signals transmitted from the two antennas in ideal EPTD are given by:

$$x_{k1} = \frac{s_k}{\sqrt{2}} \tag{8.a}$$

and $$x_{k2} = \frac{\exp j(\theta_1 - \theta_2)s_k}{\sqrt{2}} \tag{8.b}$$

Consequently, the signals received from the two antennas are perfectly phase aligned, and the SNR at the receiver is:

$$SNR_k = (|h_{k1}| + |h_{k2}|)^2 SNR_0/2, \tag{9}$$

If the total transmit power is denoted by P, P/2 is transmitted from the first antenna and P/2 is transmitted from the second antenna.

Therefore, compared to OTD, this technique reduces by 3 dB the required power characteristics of the transmit amplifiers. But, implementation of this technique remains very complex, because it requires an accurate estimation of the phase response difference of the two channels ($\theta_1 - \theta_2$).

To avoid an explicit estimation of the phase responses, the inventors have had the idea to use a simple suboptimum technique, which achieves performance close to the ideal EPTD.

In this embodiment, the suboptimum technique consists of phase aligning the received signals to within $\pi/N$, where N is the phase shift parameter. Increasing the value of phase shift parameter N will improve the performance at the expense of increased complexity.

Thus, the introduction of this phase shift parameter N allows adapting the suboptimum techniques to the processing means used by the transmitter.

In a preferred embodiment of this technique, for two transmission antennas, the inventors have taken the value N=4.

This value highly simplifies the implementation while keeping the performance loss negligible. At time k, the transmitter evaluates $H_k(n) = |h_{k1} + e^{jn\pi/2}h_{k2}|$ for n=0, 1, 2, and 3, and transmits:

$$x_{k1} = \frac{s_k}{\sqrt{2}} \tag{10.a}$$

from the first antenna, and:

$$x_{k2} = \frac{e^{jn\pi/2}s_k}{\sqrt{2}} \tag{10.b}$$

from the second antenna, where n maximizes the quantity $H_k(n) = |h_{k1} + e^{jn\pi/2}h_{k2}|$ over n=0, 1, 2, 3. The selected quantity calculation parameter n is the one that maximizes the quantity and it expresses the multiplicity of the $\pi/N$ value. Thus, only four calculations are made before deciding the phase shift that will be made. The four calculations correspond to the value of the phase shift parameter N (which is equal to four in this specific embodiment). Thus, the phase shift is done at a $\pi/N$ factor.

As described in FIG. 1, a transmitter (TR) which comprises two antennas (TA1, TA2) has to transmit a signal to a receiver (RC), which comprises one antenna (RA1). In this context, an equal-power transmit diversity is used. The first antenna TA1 is used for transmitting the signal $$x_{k1} = \frac{s_k}{\sqrt{2}}$$

while the second antenna TA2 is used for transmitting the signal $$x_{k2} = \frac{e^{jn\pi/2}s_k}{\sqrt{2}}$$

The phase shift is determined, according to the technique of this particular embodiment, by predetermining the value of n.

Thus, according to this technique, the antenna RA1 receives a signal $x_{k1} + x_{k2}$ which will not have an angle of magnitude higher than $\pi/4$.

Indeed, if $h_{k1}$ and $h_{k2}$ have a phase difference less than $\pi/4$, then n=0 maximizes $H_k(n)$, and $s_k/\sqrt{2}$ is transmitted from the second antenna.

If the two channel responses have a phase difference comprised between $\pi/4$ and $3\pi/4$, $H_k(n)$ is maximized with n=3 and $-js_k/\sqrt{2}$ is transmitted from the second antenna.

Similarly, if the two channel responses have a phase difference comprised between $3\pi/4$ and $5\pi/4$, $H_k(n)$ is maximized with n=2 and $-s_k/\sqrt{2}$ is transmitted from the second antenna.

Finally, if the two channel responses have a phase difference between $5\pi/4$ and $7\pi/4$, $H_k(n)$ is maximized with n=1 and $js_k/\sqrt{2}$ is transmitted from the second antenna.

Figure 3:
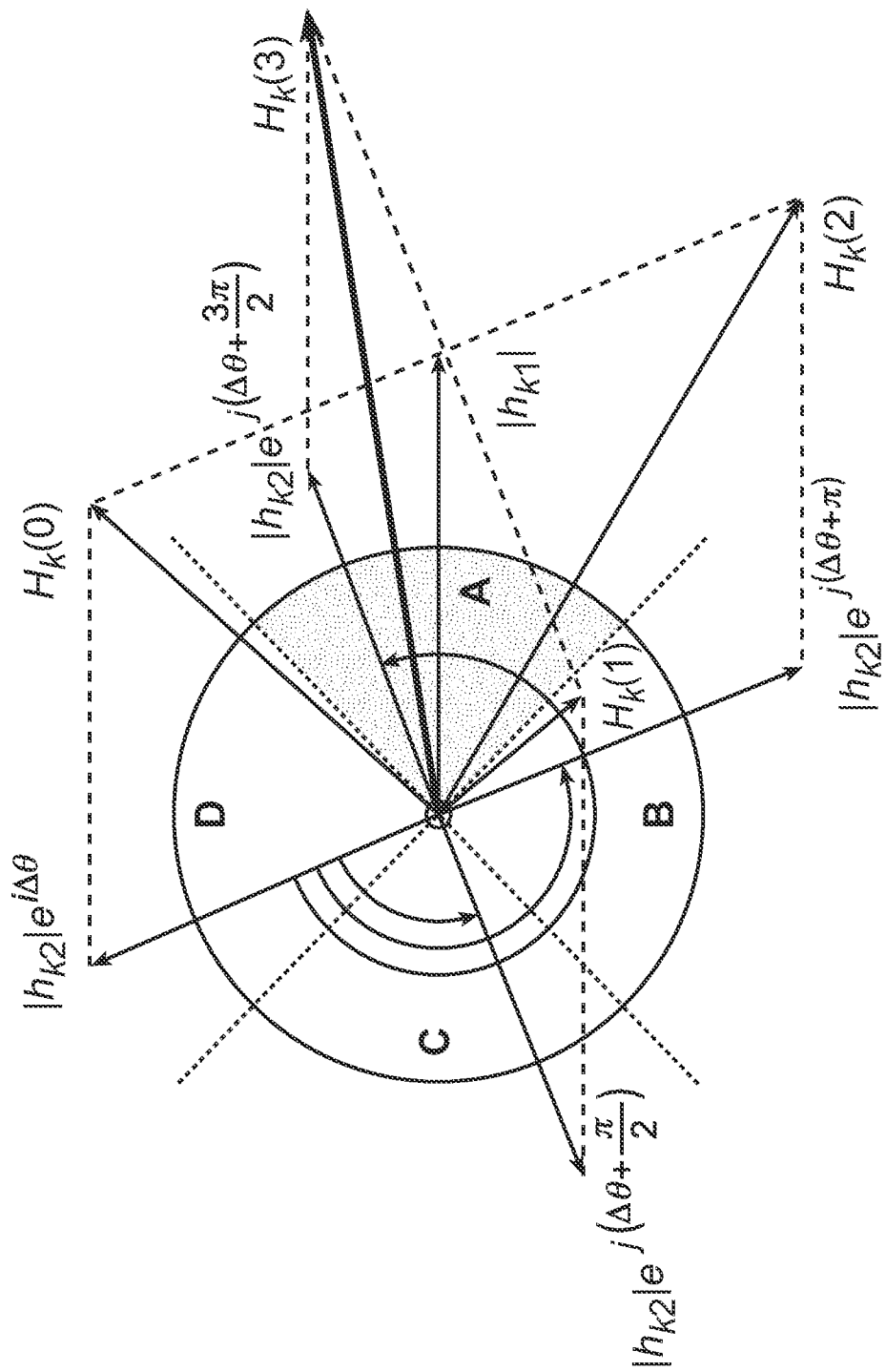
FIG. 3 shows the four regions for which a calculation, in the technique of an illustrative embodiment, is done.

This technique is illustrated, for this specific embodiment, in FIG. 3, which shows 4 regions separated by dotted diagonal lines and denoted A, B, C, and D, respectively. In region A, the phase difference between the two channel responses is $\Delta\theta \in [-\pi/4, +\pi/4]$.

Similarly, the figure illustrates $\Delta\theta \in [\pi/4, 3\pi/4]$ in region D, $\Delta\theta \in [3\pi/4, 5\pi/4]$ in region C, and $\Delta\theta \in [5\pi/4, 7\pi/4]$ in region B. The figure shows a vector $h_{k2}$ located in region D for which the optimal rotation angle is $3\pi/2$, because $H_k(3) \geq H_k(n)$, n=0, 1, 2.

In others words, the proposed technique provides better performance than switched diversity even when switching is performed on a per-carrier basis in OFDM systems. Its performance is virtually the same as Optimum Equal-Power Transmit Diversity (EPTD), which is too complex to implement. Note that Optimum EPTD performance is very close to that of MRC.

In other embodiment, if the transmitter comprises three antennas, the third antenna TA3 transmits $$x_{k3} = \frac{e^{jn\pi/2}s_k}{\sqrt{3}}$$

where m is optimized using the same type of optimization as the n parameter is optimized for antenna TA2. And so on.

In other words, in this embodiment, with three antennas, the proposed scheme transmits:

$$x_{k1} = \frac{s_k}{\sqrt{3}} \quad (11.a)$$

from the first antenna, and:

$$x_{k2} = \frac{e^{jn\pi/2} s_k}{\sqrt{3}} \quad (11.b)$$

from the second antenna, where n maximizes the quantity $H_k(n) = |h_{k1} + e^{jn\pi/2} h_{k2}|$ over n=0, 1, 2, 3 and $$x_{k3} = \frac{e^{jn\pi/2} s_k}{\sqrt{3}} \quad (11.c)$$

from the third antenna, where m maximizes the quantity $H_k(m) = |h_{k1} + e^{jm\pi/2} h_{k3}|$ over m=0, 1, 2, 3.

In this embodiment, the total power P is divided by three as we are in the ideal Equal-Power Transmit Diversity (EPTD).

With two reception antennas, performance improvement over Alamouti is reduced (or equivalently, performance degradation from optimum transmit diversity is increased), but the gain remains significant.

3. Two Antennas at the Receiver Side

The above description has been given for a single receive antenna.

In the case of two receive antennas, optimization of the n parameter which defines the rotation of the signal transmitted from the second antenna is carried out by maximizing $H_k(n) = |h_{k1} + e^{jn\pi/2} h_{k2}|^2 + |h_{k3} + e^{jn\pi/2} h_{k4}|^2$ over n=0, 1, 2, 3, where $h_{k3}$ and $h_{k4}$ are the channel responses from the first and second transmit antennas to the second receive antenna.

These calculations are made when the design parameter N is equal to four.

4. Example Application in OFDM-Based Systems

In OFDM-based systems, the procedure described above is used on a subcarrier-by-subcarrier basis, for example.

That is, when a symbol $s_{km}$ is transmitted from an antenna TA1 at time k on subcarrier m, a rotated version is transmitted from antenna TA2 at the same time k and on the same subcarrier m.

In this case, the rotation $$\frac{n\pi}{N}$$

is determined by the test on the channel responses on that subcarrier.

Thus, the transmitted signal is shifted subcarrier-by-subcarrier.

This techniques of phase shift in an OFDM-based system is different from the subcarrier-based switching technique available in the prior art, for example as described US 2005/0113041.

In this application, if half of the subcarriers are transmitted from antenna TA1 and half of them from antenna TA2, this technique transmits half of the transmit power from antenna TA1 and half of it from the other antenna TA2. But note that switching wastes power when the two channel responses (from the two transmit antennas to the receive antenna) have similar magnitudes, while switching is better than splitting the power when one of the channel responses is much smaller than the other.

The proposed EPTD technique of the present disclosure can be combined with subcarrier-based switching to provide better performance in OFDM-based systems. Indeed, a simple test on the two channel responses at a given subcarrier determines whether to use switching or power splitting (and rotation of the symbol on the second antenna) on that subcarrier.

An illustrative embodiment of the disclosure provides a transmission diversity scheme, in a multi-antenna transmission system, which does not require the use of transmit amplifiers which are each capable of transmitting the total transmit power P.

An illustrative embodiment proposes such a technique that does not lead to an important loss in terms of SNR at the receiver.

An illustrative embodiment proposes such a technique that is simple to implement and does not require heavy processing means on the transmission side.

Although the present disclosure has been described with reference to one or more examples, workers skilled in the art will recognize that changes may be made in form and detail without departing from the scope of the disclosure and/or the appended claims.

What is claimed is:

1. A method for transmitting in a communication system, said system comprising a transmitter, which comprises at least one first antenna and at least one second antenna and a receiver which comprises at least one receiving antenna, said method comprising:

a step of determining a transmit diversity scheme for at least one group of symbols from among a plurality of modulated symbols, comprising at least one step of choosing a phase shift value of at least one symbol of said at least one group of symbols, said phase shift value being chosen based on:

at least one phase shift parameter N, N being an integer, and

N calculated quantities which are functions of responses ($h_{k1}$, $h_{k2}$), respectively, between said at least one first transmitting antenna and said at least one receiving antenna and between said at least one second transmitting antenna and said at least one receiving antenna, at an emitting time k; and a step of phase shifting, which rotates said symbol of said phase shift value at a multiple of a $\pi/N$ value, wherein said step of phase shifting comprise a step of choosing a highest quantity $H_n$, among a plurality of quantities $H_k(n)$ where $0 \leq n \leq N-1$ and wherein said highest quantity $H_n$ determines a phase shift factor that is used to calculate said phase shift value.

2. The method as claimed in claim 1, wherein said step of determining comprises:

a step of processing the plurality of quantities $H_k(n)$, where $0 \leq n \leq N-1$ which are a function of:

said responses of the two antennas ($h_{k1}$, $h_{k2}$) at time k; and a quantity calculation parameter n, where $0 \leq n \leq N-1$;

a step of selecting the phase shift value based on said plurality of quantities $H_k(n)$ where $0 \leq n \leq N-1$ previously processed.

3. The method as claimed in claim 2, wherein, when said transmitter comprises one first and one second antenna and said receiver comprises one receiving antenna, said quantity $H_k(n)$ is calculated with the following formula:

$$H_k(n)=|h_{k1}+e^{jn\pi/2}h_{k2}|.$$

4. The method as claimed in claim 2, wherein said value of said phase shift is $e^{jn\pi/2}$, where $0 \leq n \leq N-1$.

5. The method as claimed in claim 2, wherein, when said transmitter comprises one first and one second antenna and said receiver comprises one first and one second antenna, said quantity H(n) is calculated with the following formula:

$$H_k(n)=|h_{k1}+e^{jn\pi/2}h_{k2}|^2+|h_{k3}+e^{jn\pi/2}h_{k4}|^2$$

where:
- $h_{k1}$ is the response of the channel between first transmitting antenna and first receiving antenna at time k;
- $h_{k2}$ is the response of the channel between second transmitting antenna and first receiving antenna at time k;
- $h_{k3}$ is the response of the channel between first receiving antenna at and second receiving antenna time k; and
- $h_{k4}$ is the response of the channel between second transmitting antenna and second receiving antenna at time k.

6. The method, according to claim 3, wherein at time k, a first signal $x_{k1}$ is transmitted from the first antenna with the value $$x_{k1} = \frac{s_k}{\sqrt{2}}$$

and wherein a second signal $x_{k2}$ is transmitted from the second antenna with the value $$x_{k2} = \frac{e^{jn\pi/2}s_k}{\sqrt{2}},$$

where $S_k$ corresponds to a symbol at time k.

7. The method according to claim 1, wherein in an OFDM based system, said method is used on a carrier-by-carrier basis, allowing calculating a phase shift for at least some of a plurality of carriers.

8. An apparatus transmitting in a communication system, said system comprising a transmitter, which comprises at least one first and at least one second antenna, and a receiver, which comprises at least one receiving antenna, said apparatus comprising:

means for determining a transmit diversity scheme for at least one group of symbols from among a plurality of modulated symbols, comprising means for choosing a phase shift value of at least one symbol of said at least one group of symbols, said phase shift value being chosen based on:
- at least one phase shift parameter N, N being an integer, and
- N calculated quantities which are functions of responses ($h_{k1}$, $h_{k2}$) respectively between said at least one first antenna and said at least one receiving antenna and between said at least one second antenna and said at least one receiving antenna, at an emitting time k, means for phase shifting, which rotates said symbol of said phase shift value at a multiple of a $\pi/N$ value, wherein phase shifting comprises a step of choosing a highest quantity $H_n$, among a plurality of quantities $H_k(n)$ where $0 \leq n \leq N-1$ and wherein said highest quantity $H_n$ determines a phase shift factor that is used to calculate said phase shift value.

9. A computer program product stored on a non-transitory computer readable medium, wherein the product includes instructions of program code for implementing a method of transmitting in a communication system, which includes a transmitter which comprises at least one first antenna and at least one second antenna and a receiver which comprises at least one receiving antenna, when run on a computer, wherein the method comprises:

a step of determining a transmit diversity scheme for at least one group of symbols from among a plurality of modulated symbols, comprising at least one step of choosing a phase shift value of at least one symbol of said at least one group of symbols, said phase shift value being chosen based on:
- at least one phase shift parameter N, N being an integer, and
- N calculated quantities which are functions of responses ($h_{k1}$, $h_{k2}$), respectively, between said at least one first transmitting antenna and said at least one receiving antenna and between said at least one second transmitting antenna and said at least one receiving antenna, at an emitting time k; and a step of phase shifting, which rotates said symbol of said phase shift value at a multiple of a $\pi/N$ value, wherein said step of phase shifting comprise a step of choosing a highest quantity $H_n$, among a plurality of quantities $H_k(n)$ where $0 \leq n \leq N-1$ and wherein said highest quantity $H_n$ determines a phase shift factor that is used to calculate said phase shift value.

* * * * *